US008190748B1

(12) United States Patent
Watson et al.

(10) Patent No.: US 8,190,748 B1
(45) Date of Patent: *May 29, 2012

(54) SYSTEM AND METHOD FOR ROUTER KEEP-ALIVE CONTROL

(75) Inventors: Thomas Lee Watson, Richardson, TX (US); David A. Gillam, The Colony, TX (US); Lance Arnold Visser, Dallas, TX (US)

(73) Assignee: Foundry Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/633,679

(22) Filed: Dec. 8, 2009

Related U.S. Application Data

(63) Continuation of application No. 09/953,714, filed on Sep. 17, 2001, now Pat. No. 7,788,381.

(51) Int. Cl.
*G06F 15/16* (2006.01)

(52) U.S. Cl. ........ 709/227; 709/238; 709/230; 370/461; 370/241

(58) Field of Classification Search .................. 709/238, 709/227, 230; 370/461, 241
See application file for complete search history.

(56) References Cited

U.S. PATENT DOCUMENTS

| | | | |
|---|---|---|---|
| 5,978,578 A | 11/1999 | Azarya | |
| 6,047,330 A * | 4/2000 | Stracke, Jr. | 709/238 |
| 6,101,188 A * | 8/2000 | Sekine et al. | 370/401 |
| 6,111,888 A * | 8/2000 | Green et al. | 370/461 |
| 6,115,393 A * | 9/2000 | Engel et al. | 370/469 |
| 6,424,629 B1 | 7/2002 | Rubino | |
| 6,430,609 B1 | 8/2002 | Dewhurst | |
| 6,580,727 B1 | 6/2003 | Yim | |
| 6,604,146 B1 * | 8/2003 | Rempe et al. | 709/238 |
| 6,675,218 B1 * | 1/2004 | Mahler et al. | 709/230 |
| 6,763,023 B1 | 7/2004 | Gleeson | |
| 6,910,148 B1 | 6/2005 | Ho | |
| 6,938,179 B2 | 8/2005 | Iyer | |
| 7,093,160 B2 | 8/2006 | Lau | |
| 7,236,453 B2 | 6/2007 | Visser et al. | |
| 7,269,133 B2 | 9/2007 | Lu | |
| 7,292,535 B2 | 11/2007 | Folkes | |
| 2003/0009562 A1 * | 1/2003 | Heymann et al. | 709/227 |

FOREIGN PATENT DOCUMENTS

| | | |
|---|---|---|
| EP | 0887731 A1 | 12/1998 |
| EP | 1107511 A2 | 8/2000 |

* cited by examiner

*Primary Examiner* — Tammy Nguyen

(74) *Attorney, Agent, or Firm* — Shun Yao; Park, Vaughan, Fleming & Dowler LLP

(57) ABSTRACT

The real-time aspects of keep-alive generation are removed from the dynamic routing protocol (DRP) application and are embedded within a Unix-based operating system, which is programmed by DRP. A keep-alive control provides the ability to create a keep-alive message and a timeout interval on a TCP socket. Each socket can have an independent keep-alive message and timeout interval. A keep-alive message is sent whenever the TCP socket sends no normal user output for a duration exceeding the timeout interval. A timeout interval is normally specific in seconds and a keep-alive message is user definable and must not exceed a predetermined length in bytes. System calls are used to set the timeout interval and keep-alive message independently. Both a timeout and a keep-alive message must be set before the timeout becomes active.

21 Claims, 3 Drawing Sheets

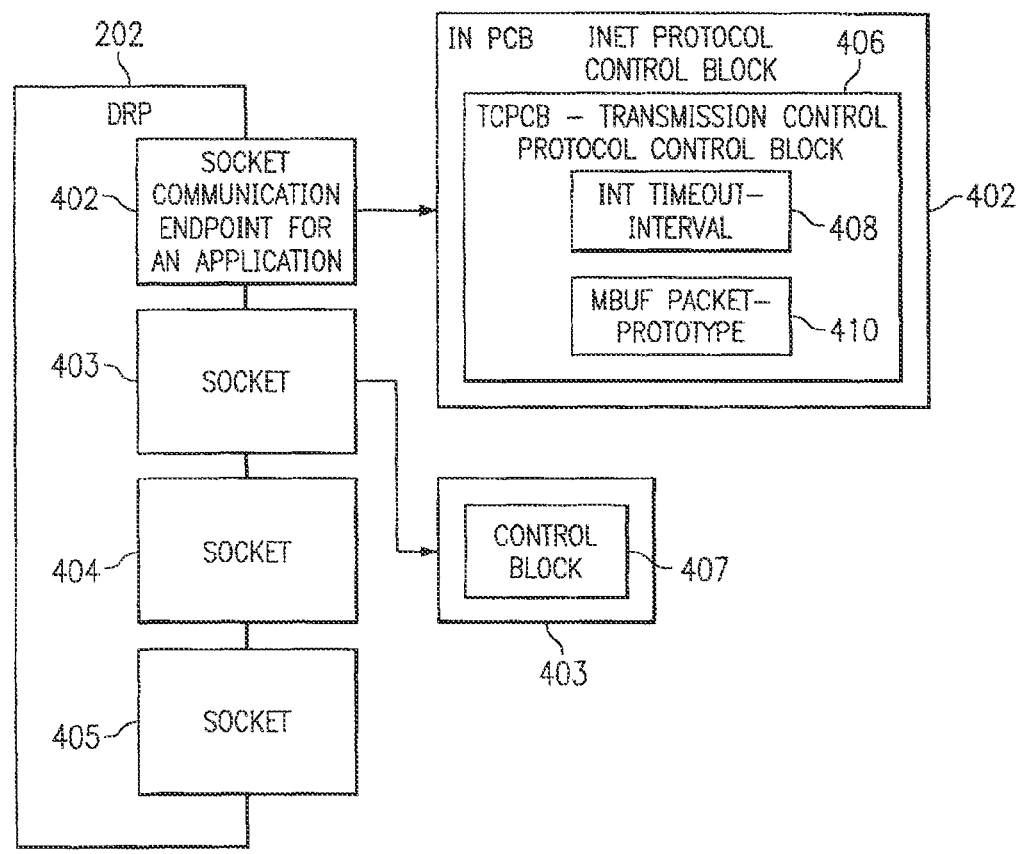

SYSTEM AND METHOD FOR ROUTER KEEP-ALIVE CONTROL

RELATED APPLICATIONS

The present patent is a continuation of, and hereby claims priority under 35 U.S.C §120 to, pending U.S. patent application Ser. No. 09/953,714, entitled "System and Method for Router Keep-Alive Control," by inventors Thomas L. Watson, David A. Gillam and Lance Arnold Visser, filed on 17 Sep. 2001. This application is related to U.S. patent application Ser. No. 09/703,057, entitled "System and Method for IP Router with an Optical Core," filed 31 Oct. 2000, the disclosure of which is hereby incorporated herein by reference.

TECHNICAL FIELD

This application relates to the field of communication networks, and particularly to large-scale routers for optical communication networks.

BACKGROUND

FIG. 1A is a schematic diagram illustrating a hierarchy of network routers. Edge routers 11-13 and 21-23 at the edge of the network 10 communicate directly with clients or through Internet service providers 15-16 and 25. Core routers 17-20 near the core 14 of network 10 communicate directly with other routers, but typically not so much with end clients. This structure is hierarchical in the sense that one core router might fan out very high speed links to multiple edge routers, which might in turn fan out to multiple corporate routers or service providers.

A router builds a route map of the Internet typically consisting of a table of 32-bit IP addresses for IPV4 (Internet Protocol Version 4) to the egress (output) port of the router. When a router receives a packet for a certain IP address, the destination IP address in the packet header is looked up in the table to select one out of many egress ports to send the packet. To build this routing table, a router establishes relationships called adjacencies with other routers using special protocols. Protocols are often layered, i.e., one protocol is built on top of another protocol.

FIG. 1B is a block diagram illustrating conventional protocol headers in a data packet. Looking at the bytes in a packet 125, there is typically an Ethernet header 121, which is the lowest layer specifying how to transfer the packet physically. Then there are typically an Internet protocol (IP) header 122 and a transmission control protocol (TCP) header 123. Finally there is typically a border gateway protocol (BGP) header 124.

FIG. 1C is a diagram illustrating how routers typically communicate with one another. Routers communicate with one another about routes using BGP protocol 31, which is built on top of TCP protocol 32, OSPF protocol 33 and various other layered protocols 34-35 as depicted in FIG. 1C. The BGP protocol of Router 40 communicates with the BGP protocols of other routers, e.g., Router 41 and Router 42, through datalinks 101 and 102. Thus all of the routers in the network collaborate together to construct the same route map 45 of the Internet as shown within all peer routers 40-42.

BGP is built on top of TCP, which is a connection oriented protocol, similar to a telephone. After a connection period at the beginning of a call, an end party once connected does not change, unlike a datagram service protocol (DSP), in which each packet flows totally independent of the packets before it. Bytes can flow back and forth bidirectionally from one TCP engine to another. Because BGP is built on top of TCP, it inherits these connection oriented characteristics. BGP establishes a connection between peer routers, like a phone call, such that peer routers send messages back and forth bidirectionally, analogous to having open phone lines between one another. BGP is a routing protocol used to construct the network route maps. The program that uses BGP is the routing software, which constructs the actual routing table.

A router needs to know if a peer router is alive, and vice-versa. All routers need to know that, and they do so by sending periodic BGP keep-alive packets across datalinks, for example datalinks 101 and 102, to make sure that the peer router answers. A very large core router typically has on the order of a thousand peer router datalinks. Each peer router needs a keep-alive packet sent to it on the order of every ten seconds. That means that there will be on the order of a hundred keep-alive packets per second transmitted by a large core router. Referring to FIG. 1C, ingress ports 103 and egress ports 104, distributed among multiple router line shelves, communicate with each of the peer routers.

A dynamic routing protocol (DRP) is basically an application that runs on this operating system Master Control Processor (MCP) and is responsible for building route maps, communicating with the peer routers, and processing keep-alive packets. There is essentially one active MCP controlling an entire router system, which communicates through internal control networks with all of the line shelves that contain the line cards that communicate with ingress and egress ports and with other routers. The reason for a single active MCP is to build a single integrated centralized routing table that encompasses the whole Internet. This routing table is distributed to packet forwarding engines in the router line shelves, which perform the actual packet processing. This results in a distributed system containing many CPUs for scalability and reliability purposes, all coordinated by a single MCP.

A problem is that the DRP application does not run in real time, yet all of the keep-alive packets need to be processed in real time, because aspects of sending keep-alive packets have hard time limits. The dynamic routing protocols run in user space on top of a non-real time Unix-based OS, which is chosen for other reasons. Therefore, it is desirable to develop a system and method of efficient real time router keep-alive control that does not require the very large DRP application, containing more than 300,000 lines of code, to run in its entirety as a real time application. It is further desirable to develop such a system with a simple user interface and with minimal modification of existing source code or system utilities.

SUMMARY OF THE INVENTION

The present invention is directed to a system and method of efficient real time router keep-alive control that does not require the DRP application to run in its entirety as a real-time application. In embodiments of the present invention, the real-time aspects of keep-alive packet processing are removed from DRP into a lower-level Unix-based operating system, which deals directly with timers and interrupts. Because it does that, it becomes easy to schedule real-time events, simply by scheduling a hardware timeout at a user selected interval. The present approach requires minimal modification of existing software and requires no modification to system utilities.

Border Gateway Protocol (BGP), used between routers, utilizes a keep-alive facility. An implementation of BGP is a user space application using TCP layered on top of a UNIX-based FreeBSD operating system. To reduce the real-time dependencies of DRP in the present implementation, the DRP programs FreeBSD to perform keep-alive control.

A keep-alive control provides the ability to create a keep-alive message and a timeout interval on a TCP socket. Each socket can have an independent keep-alive message and timeout interval. A keep-alive message is sent whenever the TCP socket does not send normal output for a duration exceeding the timeout interval. A timeout interval is normally specified in seconds and a keep-alive message is user definable and must not exceed a predetermined length in bytes. A setsockopt system call is used to set the timeout interval and keep-alive message. Similarly, a getsockopt system call is used to retrieve the current timeout interval or keep-alive message. The timeout and keep-alive message are set independently with separate invocations of the setsockopt system call. Both a timeout and a keep-alive message must be set before the timeout becomes active.

Various aspects of the invention are described in co-pending and commonly assigned U.S. application Ser. No. 09/703,057, entitled "System And Method For IP Router With an Optical Core," filed Oct. 31, 2000, the disclosure of which has been incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 is a block diagram logically illustrating the modifications to the DRP application software relating to programming the operating system to perform keep-alive processing.

DETAILED DESCRIPTION

In embodiments of the present invention, the real-time aspects of keep-alive processing are removed out of the dynamic routing protocol (DRP) application and embedded within the Unix-based operating system. Particularly, this change has been made for BGP protocol keep-alive processing.

A keep-alive control provides the ability to create a keep-alive message and a timeout interval on a TCP socket. Each socket can have an independent keep-alive message and timeout interval. A keep-alive message is sent whenever the TCP socket does not send normal output for a duration exceeding the timeout interval. A timeout interval is normally specified in seconds and a keep-alive message is user definable and must not exceed a predetermined length in bytes. A setsockopt system call is used to set the timeout interval and keep-alive message. Similarly, a getsockopt system call is used to retrieve the current timeout interval or keep-alive message. The timeout and keep-alive message are set independently with separate invocations of the setsockopt system call. Both a timeout and a keep-alive message must be set before the timeout becomes active.

Figure 1A:
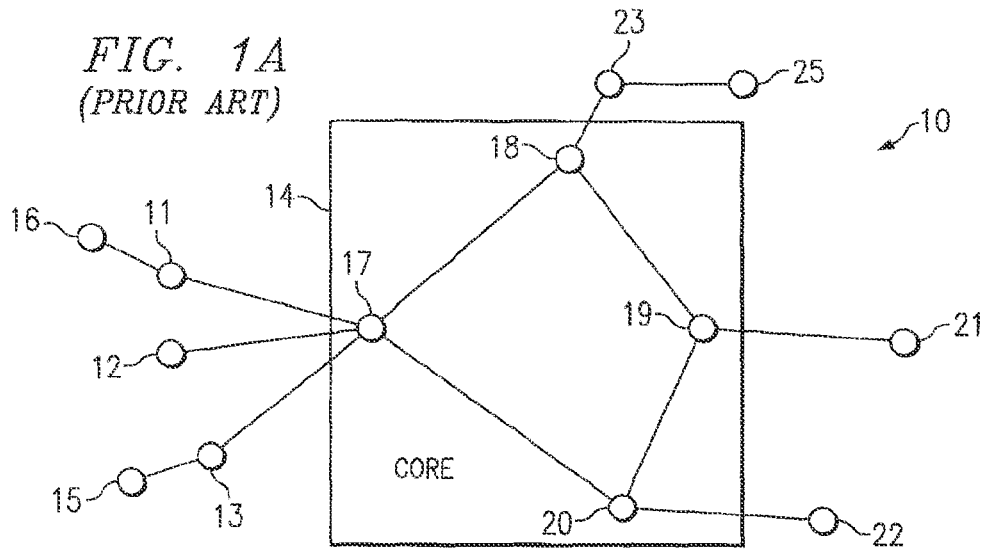
FIG. 1A is a schematic diagram illustrating a hierarchy of network routers.
Figure 1B:
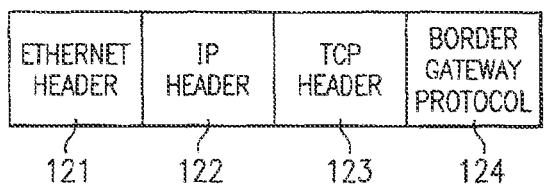
FIG. 1B is a block diagram illustrating conventional protocol headers in a data packet.
Figure 1C:
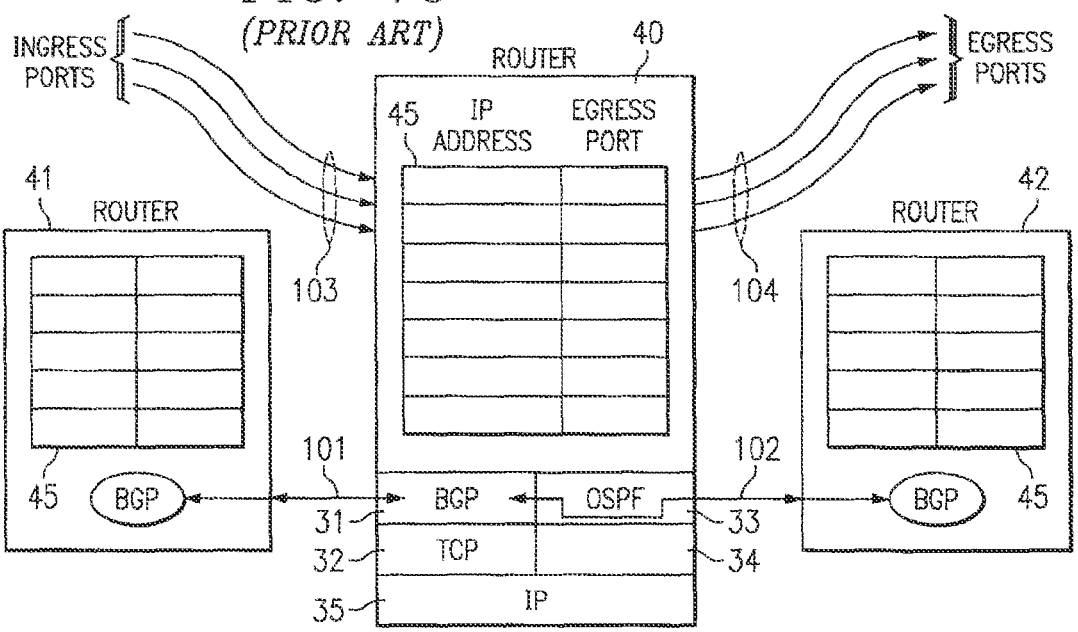
FIG. 1C is a diagram illustrating how routers typically communicate with one another.
Figure 2:
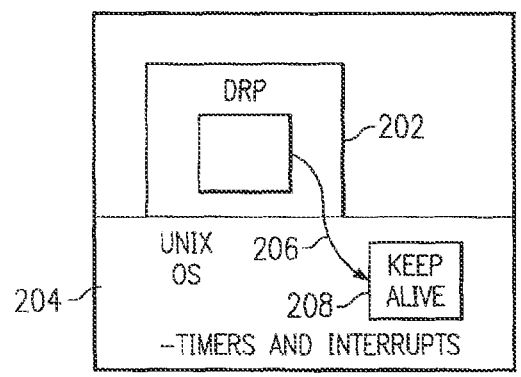
FIG. 2 is a schematic diagram illustrating the logical relationships between the DRP software and the operating system containing keep-alive processing.

FIG. 2 is a schematic diagram illustrating the logical relationships between the DRP software and the operating system containing keep-alive processing. The dynamic routing protocol (DRP) software 202 programs the operating system 204 through interfaces 206, telling an embedded keep-alive scheduler 208 how often to generate keep-alive packets and providing a prototypical keep-alive message to be replicated into each keep-alive packet. A keep-alive packet is typically modified by operating system 204, however, to insert a steadily incrementing sequence number. In general, DRP software 202 programs the operating system to generate keep-alive packets periodically, and then the DRP software is free from further keep-alive responsibilities. Consequently DRP software 202 is not constrained to run in real time. Only OS 204 is constrained to run in real time.

Figure 3:
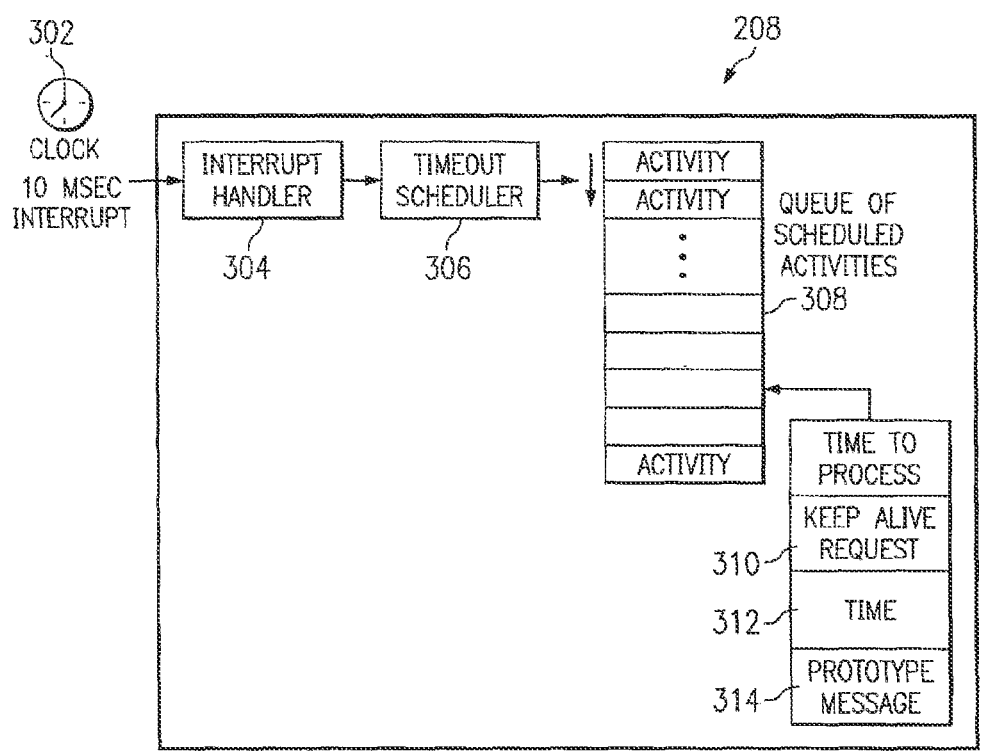
FIG. 3 is a schematic diagram logically illustrating the functions of an embedded keep-alive processor.

FIG. 3 is a schematic diagram logically illustrating the functions of embedded keep-alive scheduler 208. A hardware-generated clock 302 issues an interrupt approximately every ten milliseconds to an existing interrupt handler 304, which among other tasks on its clock interrupt schedule performs timeout scheduling. Timeout scheduler 306 maintains an existing queue or list of scheduled activities 308. For each required keep-alive message queue 308 is programmably modified to insert an entry that is essentially a keep-alive request, for example keep-alive request 310, which includes a time 312 when it needs to be sent and a prototypical keep-alive message 314.

As clock interrupt 302 runs, timeout processor 306 in interrupt handler 304 steps down queue 308. Each entry in queue 308 has a designated time to be processed. When the current time equals the designated time to be processed, the entry activity is performed. Accordingly, when the current time equals the time 312 to generate a keep-alive request, then timeout scheduler 306 schedules keep-alive interrupt routine 310, which generates a timeout message from prototypical message 314 that was programmed into it by the DRP software 202. Then it sends out the keep-alive packet and reschedules itself for the next timeout period, resulting in a periodic sequence of keep-alive packets.

FIG. 4 is a block diagram logically illustrating the modifications to DRP application software 202 relating to programming operating system 204 to perform keep-alive scheduling. A socket is a communication end point for an application. There are sockets 402-405 known to DRP software 202, that are part of programming interface 206 between the DRP software and for example a FreeBSD operating system 204. Within DRP application 202, sockets are named by small integers called descriptors, for example socket 3 or socket 5.

Associated with each socket is an Internet Protocol Control block, for example Transmission Control Protocol Control Blocks (TCPCB) 406 and 407 associated with respective sockets 402 and 403. Within TCPCB 406 are shown two added fields, one of which is an integer 408 that specifies the timeout interval, and other a prototypical keep-alive message 410 to send when that timeout interval expires.

DRP application 202 makes special system calls called setsockopt 10 control calls to set up fields 408 and 410 in TCPCB 406. Once it does that, code and FreeBSD OS 204 schedule a timeout. Timeout scheduler 306 looks at the current time, adds timeout interval 408, schedules the timeout that far in the future, and timeout scheduler 306 executes the particular software code that generates the keep-alive packet, sends it, and then schedules the next timeout. When normal user message output occurs before the timeout interval expires, then no keep-alive message is sent, but the timeout interval is reset despite the fact that the current timeout interval has not expired. This occurs cyclically, until a timeout interval expires without the transmission of a normal user output packet. Thus, a keep-alive message is sent only when a timeout interval expires without normal user message output.

The present embodiment includes various kernel source code changes for TCP keep-alive control. Two new options added to the existing TCP socket options are supported by both the setsockopt and getsockopt system calls. Both options are added to an existing include file <netinet/tcp.h> and must be successfully set before a keep-alive message can be enabled and the timeout interval started. Furthermore an active socket must be established before a timeout or keep-alive message can be set.

The option TCP_OUTPUT_KEEPALIVE_TIMEOUT is used to specify the timeout interval value. The following call for example sets the keep-alive timeout to 19 seconds:

```
int s;
int timeo = 19;
struct protoent = *pe;
/*
 * s is a file descriptor of an
 * established socket
 */
pe = getprotobyname("tcp");
setsockopt(s, pe->p_proto,
    TCP_OUTPUT_KEEPALIVE_TIMEOUT, &timeo,
    sizeof(timeo));
```

The option TCP_OUTPUT_KEEPALIVE_MSG is used to specify the keepalive message. Its parameters are a pointer to the message and the size of the message in bytes. The following call sets the keep-alive message to the string "TIMEOUT":

```
int s;
char buf [ ] = "TIMEOUT";
struct protoent = *pe;
/*
 * s is a file descriptor of an
 * established socket
 */
pe = getprotobyname("tcp");
setsockopt(s, pe->p_proto,
    TCP_OUTPUT_KEEPALIVE_MSG, buf,
    strlen(buf) + 1);
```

When either option is successfully set and a keep-alive timeout is already in process, the timeout is reset. For example, assuming the two calls in the examples above had been made and 18 seconds of a timeout interval had already expired, then if a call is successfully made to change the keep-alive message buffer, the timeout is reset to 19 seconds. The present embodiment includes a simple user interface built upon exiting setsockopt and getsockopt system calls, with minimal change to existing source code. In particular, there is a strong advantage to maintaining code compatibility with future FreeBSD releases. No utilities are modified to support TCP keep-alive control.

High-level design elements include:
- Modify a per-socket data structure to maintain a timeout timer, timeout value, and keep-alive message.
- Modify the TCP layer of setsockopt/getsockopt system calls to initialize the per-socket data structure and start the timer.
- Create a timeout routine to send the keep-alive message.
- Modify the TCP socket output function to reset the keep-alive timer whenever it sends output.
- Deallocate any keep-alive resources when a TCP socket is destroyed.
- Maintain state about the output socket stream, so that a keep-alive message is not inserted into the middle of a user message.

FreeBSD TCP implementation lends itself to these modifications with extensions to existing data structures and functions. TCP keep-alive control is specified when the kernel is configured with the config utility to include a line of code in the kernel configuration file that enables TCP keep-alive control. The TCP Control Block data structure is modified to maintain the timeout timer, the timeout value, and the timeout message. The first new field contains the timeout value. The second is a pointer to a mbuf containing the prototypical keep-alive message.

The last field is a pointer to the timeout callout structure used for timeout registration. This pointer is set to the address of a new field in the inp_tp structure.

```
struct tcpcb {
    .
    .
    .
    struct tcp_output_KeepAlive {
        int o_ka_timeout;
        struct mbuf *o_ka_msg;
        struct callout *o_ka_callout;
    } tcp_o_ka;
};
struct inp_tp {
    .
    .
    .
    struct callout
inp_tp_output_keepalive;
};
```

There are three items of interest regarding the mbuf
- The mbuf is allocated and filled in during the processing of the TCP_OUTPUT_KEEPALIVE_MSG setsockopt system call.
- When the socket is deallocated, the mbuf is freed.
- Keep-alive messages have a predetermined size limit, typically 224 bytes.

A new mbuf flag is used to mark the spots in the output stream of the socket that correspond to completed writes from user space. Whenever a write/send is done from user space, the final mbuf of the write/send is marked with this flag M_SPLICEPNT.

Five functions are modified, namely:

tcp_ctloutput( )

This function contains the TCP layer of the setsockopt/getsockopt system calls. The two new options are added to the switch cases. The pseudo code for the modifications is shown below.

```
int
tcp_ctloutput(
    struct socket *so,
    struct socketopt *sopt)
(
    .
    .
    .
    switch (sopt->sopt_dir) {
    case SOPT_SET:
    switch (sopt->sopt_name) {
        .
        .
        .
      case TCP_OUTPUT_KEEPALIVE_TIMEOUT:
        if (so is not established)
            return EINVAL;
        error = copy args from user space;
        if (error)
            return error;
        if (timeout < 0)
            return EINVAL;
        save the timeout value in the
            tcpcb;
        if (a timeout message has been set)
            re-arm the timer;
        break;
      case TCP_OUTPUT_KEEPALIVE_MSG:
        if (so is not established)
            return EINVAL;
        if (message size > 224)
            return EMSGSIZE;
        if (message size is 0)
            if (old message exist)
                free old message mbuf;
            set message pointer to NULL;
            disable the timer;
            break;
        m = allocate a mbuf;
        if (m is NULL)
            return ENOBUFS;
        error = copy message from user space
            into m;
        if (error)
            free m;
            return error;
        if (old message exist)
            free old message mbuf;
            save pointer to new m;
        if (timeout value has been set)
            re-arm the timer;
        break;
    }
    case SOPT_GET:
    switch (sopt->sopt_name) {
        .
        .
        .
      case TCP_OUTPUT_KEEPALIVE_TIMEOUT:
        error = copy timeout value to
            user space;
        if (error)
            return error;
        break;
      case TCP_OUTPUT_KEEPALIVE_MSG:
        error = 0;
        if (there is a message set)
            error = copy message to user
                space;
        if (error)
```

-continued

```
            return error;
        break;
    }
}
}
``` tcp_close( )

This function is called when a TCP socket is being deallocated. A simple change is made at the end of the function to free the mbuf if one has been allocated (e.g. tcp_o_ka.o_ka_msg is non-null).

tcp_output( )

This function is called when the TCP socket has output to send. A small change made to the function re-arms the keep-alive timer after output is sent.

sosend( )

This function is called when a socket outputs data and is modified to set the M_SPLICEPNT flag in the last mbuf of the socket that the user is outputting on.

sbcompress( )

This function is called to compress (e.g. pull-up) an mbuf in a socket buffer, and is modified so that it does not compress an mbuf into an mbuf that has its M_SPLICEPNT flag set.

A new function is added to handle timeout events for sending Output KeepAlive messages, namely.

tcp_timer_output_KeepAlive( )

This function, responsible for sending keep-alive messages, is called from interrupt level. The pseudo code for the function follows.

```
void
tcp_timer_output_KeepAlive(
    void *xtp)
{
    struct mbuf *m = tp->cp_o_ka.o_ka_msg;
    if (m is NULL)
        disable the timer;
        return;
    if (tp is no longer established)
        re-arm the timer;
        return;
    if (m will not fit in socket
            output buffer)
        re-arm the timer;
        return;
    if (the M_SPLICEPNT flag is set on the
            last mbuf in the socket buffer)
        re-arm the timer;
        return;
    error = create a copy of m in a
        new mbuf;
    if (error)
        re-arm the timer
        return;
    add the duplicate message to the socket
        output buffer;
    error = start output on the socket;
    if (error)
        re-arm the timer;
    return
}
```

Two new kernel state variables are added, which count respectively the number of TCP keep-alive messages that have been sent and the number that have been dropped. These new variables, which are accessed via the sysctl command, are respectively:

net.inet.tcp.output_keepalive_sent; and
net.inet.tcp.output_keepalive_dropped.

Although BGP protocol has been used as an example in the above discussion, other protocols besides BGP can be adapted to other implementations of the present invention. For example Open Shortest Path First (OSPF) routing protocol works on top of Internet protocol without TCP, and consequently has different requirements for different kinds of packets. In an alternative embodiment, the principles of the present invention can be applied to OSPF in the operating system. This can be implemented on a different processor in order to achieve greater scalability. OSPF keep-alive processing can for example be performed in packet forwarding engines (PFEs) distributed throughout a router system (see U.S. application Ser. No. 09/703,057, cited above). By using multiple processors, not only is the real time keep-alive problem solved as with BGP, but additionally processing is off-loaded to on the order of hundreds of forwarding engine processors. Distributing the keep-alive processing across all of these processors instead of constraining it to only one MCP makes the system more scalable.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
   a processor;
   a number of network interfaces coupled to the processor;
   a dynamic routing application which is not constrained to run in real time and is not responsible for sending keep-alive messages in real time; and
   an operating system kernel configured to send periodically keep-alive messages in real time on behalf of the dynamic routing application, thereby allowing the dynamic routing application to be free from keep-alive responsibilities.

2. The system of claim 1, wherein the keep-alive messages are user-definable.

3. The system of claim 1, wherein the operating system kernel is configured to send the keep-alive messages via a TCP socket.

4. The system of claim 3, wherein the operating system kernel is configured to send periodical keep-alive messages to a number of TCP sockets; and
   wherein the keep-alive messages for a respective TCP socket are sent independently from keep-alive messages sent via other TCP sockets.

5. The system of claim 1, wherein the operating system kernel runs in real time.

6. The system of claim 1, wherein sending the keep-alive messages is triggered by a timeout period during which no user message is sent.

7. The system of claim 6, wherein the operating system facilitates an interface which allows the timeout period to be configured.

8. A router comprising:
   a processor;
   a number of network interfaces coupled to the processor;
   a piece of dynamic routing protocol (DRP) which is not constrained to run in real time and is not responsible for sending keep-alive messages in real time; and
   an operating system kernel configured to send periodically keep-alive messages in real time on behalf of the DRP, thereby allowing the DRP to be free from keep-alive responsibilities.

9. The router of claim 8, wherein the keep-alive messages are Border Gateway Protocol (BGP) or Open Shortest Path First (OSPF) keep-alive messages.

10. The router of claim 8, wherein the operating system kernel is configured to send the keep-alive messages via a TCP socket.

11. The router of claim 10, wherein the operating system kernel is configured to send periodical keep-alive messages to a number of TCP sockets; and
    wherein the keep-alive messages for a respective TCP socket are sent independently from keep-alive messages sent via other TCP sockets.

12. The router of claim 8, wherein the operating system kernel runs in real time.

13. The router of claim 8, wherein sending the keep-alive messages is triggered by a timeout period during which no user message is sent.

14. The router of claim 13, wherein the operating system facilitates an interface which allows the timeout period to be configured.

15. A computer-implemented method comprising:
    performing routing functions using a dynamic routing application which is configured to run on a processor and which is not constrained to run in real time and not responsible for sending keep-alive messages in real time; and
    periodically sending keep-alive messages in real time by an operating system kernel on behalf of the dynamic routing application, thereby allowing the DRP to be free from keep-alive responsibilities.

16. The method of claim 15, wherein the keep-alive messages are user-definable.

17. The method of claim 15, wherein the keep-alive messages are sent via a TCP socket.

18. The method of claim 17, wherein the keep-alive messages are sent periodically to a number of TCP sockets; and
    wherein the keep-alive messages for a respective TCP socket are sent independently from keep-alive messages sent via other TCP sockets.

19. The method of claim 15, further comprising running the operating system kernel in real time.

20. The method of claim 15, wherein sending the keep-alive messages is triggered by a timeout period during which no user message is sent.

21. The method of claim 20, further comprising allowing the timeout period to be configured.

* * * * *